United States Patent [19]
Watkins et al.

[11] 4,359,557
[45] Nov. 16, 1982

[54] PROCESS FOR PRODUCING LOW PILLING TEXTILE FIBER AND PRODUCT OF THE PROCESS

[75] Inventors: Kenneth R. Watkins; Leron R. Dean, both of Kingsport, Tenn.

[73] Assignee: Eastman Kodak Company, Rochester, N.Y.

[21] Appl. No.: 244,365

[22] Filed: Mar. 16, 1981

Related U.S. Application Data

[63] Continuation-in-part of Ser. No. 186,103, Sep. 11, 1980, abandoned.

[51] Int. Cl.³ .............................................. C08G 63/46
[52] U.S. Cl. ................................ 525/437; 264/210.8; 264/235.6; 528/309
[58] Field of Search ................. 264/211, 235.6, 210.8; 528/309; 525/437

[56] References Cited

U.S. PATENT DOCUMENTS

| | | | |
|---|---|---|---|
| 3,361,859 | 1/1968 | Cenzato | 264/210.8 |
| 3,448,573 | 6/1969 | Glen et al. | 264/210.8 |
| 3,452,132 | 6/1969 | Pitzl | 264/210.8 |
| 3,808,302 | 4/1974 | Dyer et al. | 264/176 Z |
| 3,892,021 | 7/1975 | Izawa et al. | 264/210.8 |
| 3,998,921 | 12/1976 | Kohler et al. | 264/210.8 |
| 4,003,974 | 1/1977 | Chantry et al. | 264/210.8 |
| 4,025,592 | 5/1977 | Bosley et al. | 264/78 |
| 4,043,985 | 8/1977 | Vock | 528/272 |
| 4,076,783 | 2/1978 | Yasuda et al. | 264/78 |

FOREIGN PATENT DOCUMENTS

| | | | |
|---|---|---|---|
| 43-4546 | 2/1968 | Japan | 264/176 Z |
| 47-2061 | 1/1972 | Japan | 264/176 Z |
| 49-35618 | 4/1974 | Japan | 264/78 |
| 50-13622 | 2/1975 | Japan | 264/78 |

*Primary Examiner*—Jay H. Woo
*Attorney, Agent, or Firm*—Malcolm G. Dunn; Daniel B. Reece, III

[57] ABSTRACT

Process for manufacturing polyethylene terephthalate fibers having improved low-pilling properties by admixing ethylene glycol with polyethylene terephthalate polymer in extruder and holding the resulting processed fiber at constant length while heatsetting the fiber, and preferably relaxing the fiber up to about 5% while being heatset to a controlled length; and a polyester fiber as made by the process.

16 Claims, 1 Drawing Figure

PROCESS FOR PRODUCING LOW PILLING TEXTILE FIBER AND PRODUCT OF THE PROCESS

This is a continuation-in-part application of U.S. Ser. No. 186,103 filed Sept. 11, 1980 abandoned.

DESCRIPTION

1. Technical Field

Our invention is directed to a process for producing pill-resistant polyethylene terephthalate fibers and to polyethylene terephthalate fibers as made according to the process.

2. Background Art

Polyethylene terephthalate fibers, the preparation of such being described in U.S. Pat. No. 2,465,319, are widely used in the preparation of fabrics characterized by ease-of-care properties associated with fast drying, crease recovery and wrinkle resistance, as well as strength and abrasion resistance.

The use of polyethylene terephthalate staple fibers, however, for certain end uses has been restricted by a phenomenon known as "pilling", which refers to the accumulation on the surface of the fabric of numerous unsightly small balls of fiber, sometimes with the inclusion of foreign matter. It has long been recognized that the unsightly effect of pilling was not due so much to the formation of pills, which occurs in all fabrics prepared from staple fibers, but to the difficulty in wearing off the pills once formed, since the strength and abrasion resistance of polyethylene terephthalate prevents their rapid removal during normal use of the fabrics.

Many attempts have been made to modify the polyethylene terephthalate fiber per se in order to inhibit the tendency toward pilling in fabrics containing the staple fiber. One of the solutions to the problem has been to prepare the fiber from polymer of relatively low molecular weight, characterized by sharply reduced viscosity values. Unfortunately, in attempting to reduce the viscosity of the spun polyethylene terephthalate, it has been found that the difficulty in spinning the polymer rapidly increases as the viscosity decreases. The chief problems encountered when the melt viscosity is low are maintenance of the uniformity of the product and continuity of spinning of the molten filaments without the formation of "drips". Most extruders used for commercial production of polyester fibers are designed for polyester resins having an inherent viscosity of 0.50 to 0.70 and a resultant high melt viscosity. When low inherent viscosity (i.e. low I.V.), low melt viscosity polymers are extruded, those extruders do not feed and control well and the pressure of the melt delivered to the metering pumps is quite variable. Engineering design considerations indicate that it would be difficult to achieve enough energy input in an extruder screw to melt the low I.V. polymer but still retain a high melt viscosity for uniform metering and pressure control. This is an undesirable situation and suggests the need for a means other than low I.V. polymer for producing low pill polyester fiber.

The inherent viscosity of polymers or fibers referred to in this specification is determined by a concentration of 0.5% of the polymer or fiber in a solvent of 60% by weight phenol and 40% by weight tetrachloroethane, with the polymer or fiber being dissolved at 125° C. and being measured at 25° C.

U.S. Pat. No. 3,808,302 discloses a process for producing a pill-resistant polyethylene terephthalate textile fiber by feeding to a spinning machine fiber grade polyethylene terephthalate polymer having an inherent viscosity of about 0.55 to 0.65, and about 0.20% to 0.35% by weight of alumina trihydrate; heating the polymer and alumina trihydrate during its passage through the extruder barrel of the spinning machine to a temperature sufficient to cause the release of a major portion of the available water in the alumina trihydrate and thereby reduce the inherent viscosity of the polymer by hydrolytic degradation; cooling the polymer at the spinning orifice about 30° C. or more; forming and taking up the polyethylene terephthalate fiber. The low I.V. fiber produced is preferably processed by feeding the fiber through a water bath heated to about 70° C. at a speed of about 100 meters per minute with minimum snubbing; drafting the fiber about 2.5:1; passing the fiber through a steam atmosphere heated to about 160° C. while subjecting the fiber to a draft tension of about 0.5 gram/denier; and heatsetting the fiber for about five minutes at a temperature of about 170° C. The fiber made by the process is a pill-resistant textile fiber of polyethylene terephthalate, the fiber having an inherent viscosity of about 0.370 to 0.40, fiber toughness of about 0.7 to 0.8 gram/denier; ultimate tenacity of about 2.6 to about 3.2 grams/denier, and an elongation of about 25% to 40%.

The residual of the alumina trihydrate remaining in the fiber, however, is too abrasive for equipment with which the fiber comes into contact during subsequent processing.

U.S. Pat. No. 3,245,955 discloses another process for reducing pilling in fibers of polyethylene terephthalate, which process involves adding to the polyethylene terephthalate 0.01% to 5% of its weight of terephthalic acid, isophthalic acid, dimethylterephthalate, dimethyl isophthalate, diglycol terephthalate, diglycol isophthalate, or a mixture of these as a decomposing agent.

DISCLOSURE OF THE INVENTION

In accordance with the present invention, we provide a process for manufacturing polyethylene terephthalate fibers having improved low pilling properties. The process involves admixing in the feed throat of an extruder polyethylene terephthalate discrete solid polymer materials having an inherent viscosity of about 0.56 to about 0.60 with about 0.25% by weight ethylene glycol to form an admixture; the solid polymer materials in the extruder are melted into a liquid and the admixture is reacted to lower the inherent viscosity of the polyethylene terephthalate to an inherent viscosity of about 0.39 to about 0.43. Inherent viscosity is determined by a concentration of 0.5% of the polymer in a solvent comprising 60% by weight phenol and 40% by weight tetrachloroethane, the polymer being dissolved at 125° C. and being measured at 25° C. The reacted admixture is extruded into fibers; the fibers are drafted; and then the fibers are heatset at a constant length. Preferably the fibers (in tow form) are relaxed up to about 5% while being heatset to a controlled length, and still more preferably the fibers (in tow form) are relaxed up to about 2.5% while being heatset to a controlled length.

The discrete solid polyethylene polymer materials may preferably be in the form of pellets.

The fibers are preferably heatset at a constant length for about 90±5 seconds at a temperature of about 200° C. to about 215° C.

The extruder is maintained at a temperature of about 265° C. to about 273° C., and preferably at a temperature of about 268° C. to about 271° C.

The polyethylene terephthalate discrete solid polymer materials preferably have an inherent viscosity of about 0.58 to about 0.60.

We also provide a polyester fiber as made by the process described above, the fiber being low-pilling, and having a tenacity of about 3.5 to about 4.5 grams per denier, and an elongation of about 17% to about 27% and tenacity at 10% elongation of about 2.9 to about 3.5 grams/denier, and a shrinkage at 190° C. for 10 minutes of about 6% to about 8%. When the fibers are relaxed while being heatset to a controlled length, they have a tenacity of about 3.5 to about 4.65 grams per denier, and preferably about 4.00 to about 4.5 grams per denier; an elongation of about 17% to about 27%; tenacity at 10% elongation of about 2.9 to about 3.95 grams per denier, and preferably about 3.2 to about 3.7 grams per denier; and a shrinkage at 190° C. for ten minutes of about 6% to about 8%.

BEST MODE FOR CARRYING OUT THE INVENTION

The low-pilling polyethylene terephthalate fiber of this invention is made in accordance with the process of the invention. Discrete solid polymer materials of polyethylene terephthalate having an inherent viscosity (I.V.) of about 0.56 to about 0.60, and preferably 0.58, are fed into the throat of an extruder. At the same time and at the same feed throat location about 0.25% ethylene glycol is injected into the extruder along with the discrete solid polymer materials.

The discrete solid polymer materials of polyethylene terephthalate and injected ethylene glycol thus form an admixture in the extruder. As the screw of the extruder advances the admixture through the extruder, the discrete solid polymer materials are melted into a liquid, and the resulting admixture of melted polymer liquid and ethylene glycol are reacted, causing a lowering of the inherent vicosity when the reacted admixture is melt extruded from the extruder through a desired size spinneret having the desired number of spinneret orifices.

The extruder is maintained at a temperature of about 265° C. to about 273° C., and preferably at a temperature of about 268° C. to about 271° C.

The extruded fibers are then processed, including the process steps of drafting, the fibers being drawn at a ratio of about 3.9:1 to about 4.3:1, and preferably about 4.0:1 to about 4.125:1, and then the fibers are heatset while being held at constant length, preferably the fibers being heatset for about 90±5 seconds at a temperature of about 200° C. to about 215° C. while being held at constant length. Preferably still, the fibers are relaxed up to about 5% while being heatset to a controlled length and more preferably the fibers are relaxed up to about 2.5% while being heatset to such controlled length. Such relaxation may be accomplished in the heatsetting oven, such as the one shown in FIG. 2a in U.S. Pat. No. 3,500,553, by reducing by an appropriate amount the speed of the driven rolls identified at 20 inm FIG. 2a.

The finished processed polyethylene terephthalate fibers are low-pilling; have a tenacity of about 3.5 to about 4.5 grams/denier; and have an elongation of about 17% to about 27% and tenacity at 10% elongation of about 2.9 to about 3.5 grams/denier, and a shrinkage at 190° C. for ten (10) minutes of about 6% to about 8%.

As heretofore mentioned, when the fibers are relaxed while being heatset to a controlled length, they have a tenacity of about 3.5 to about 4.65 grams per denier, and preferably about 4.00 to about 4.5 grams per denier; an elongation of about 17% to about 27%; tenacity at 10% elongation of about 2.9 to about 3.95 grams per denier, and preferably about 3.2 to about 3.7 grams per denier; and a shrinkage at 190° C. for 10 minutes of about 6% to about 8%.

Figure 1:
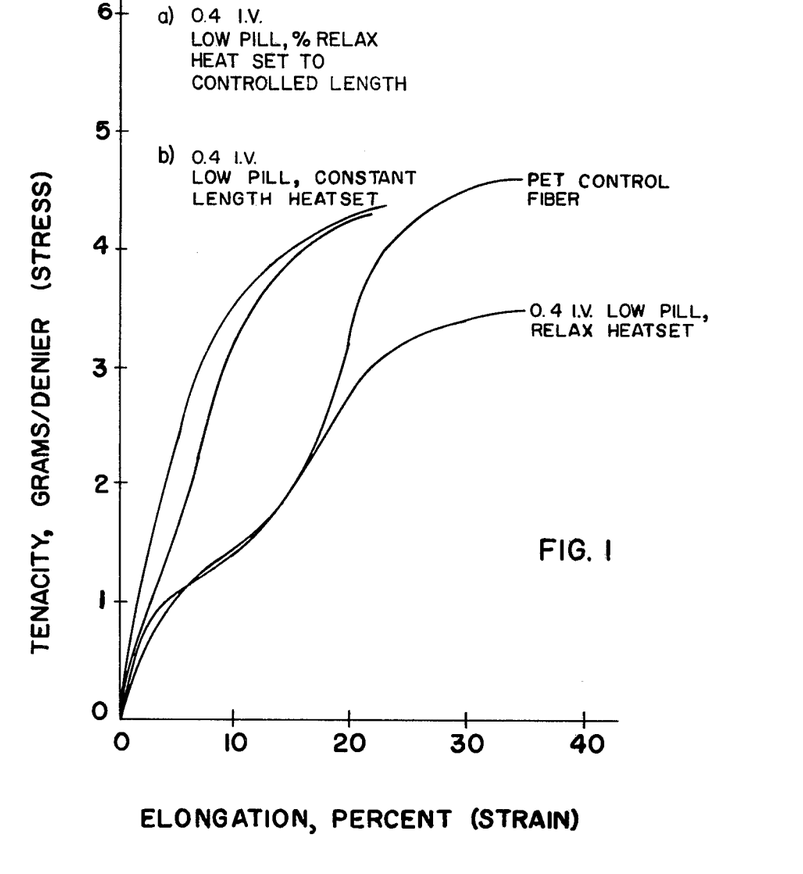
FIG. 1 is a drawing of stress-strain curves for comparing the low-pill fiber, which is heatset at a constant length, and the preferred embodiment of the low-pill fiber, which is relaxed to a predetermined extent while heatsetting to a controlled length, with the PET (polyethylene terephthalate) control fiber and a low-pill fiber, which is completely relaxed while being heatset.

The low-pilling fiber of the invention is compared herein, for instance, with what we shall identify herein as the PET (polyethylene terephthalate) control fiber. The PET control fiber has the same starting polymer inherent viscosity (I.V.) of 0.58±0.02; an extruder melt temperature of about 300° C.±1.0° C.; no ethylene glycol addition; and the resulting fiber has an I.V. of about 0.56±0.02. The fiber was heatset in a relaxed state at about 136° C. to about 140° C. for about 4.5 minutes. The fiber of the invention is held at constant length while being heatset. FIG. 1 may be referred to for a comparison of the stress-strain curve for the PET control fiber with the stress-strain curve of the low-pilling fiber of the invention. Note also the first table under Example 1 for a comparison of fiber properties.

A further comparison is made in FIG. 1 by illustrating an 0.4 I.V. low-pill fiber that has the same starting polymer I.V. of about 0.58±0.02; addition of 0.25% ethylene glycol in the extruder throat along with the polymer; an extruder melt temperature of about 265° C. to about 270° C.; and heatset in a relaxed state at a temperature of about 130° C. to about 140° C. The tenacity of this fiber is about 3.5 grams/denier±0.5; it has an elongation of about 30% to about 40%; and it has a tenacity at 10% elongation of about 1.3 to about 1.7 grams/denier.

The following examples serve to illustrate the invention, but they are not intended to limit the invention thereto:

EXAMPLE 1

Exactly 0.25% ethylene glycol was added to polyethylene terephthalate polymer having an inherent viscosity (I.V.) of about 0.58, and the resulting mixture was extruded into fiber. A 500-pound creeling of 1½ denier per filament (D/F) was made under the following conditions:

| Spinneret | = 750 holes, each hole being 0.3 millimeter in diameter |
| --- | --- |
| Melt temperature | = 268° C. |
| Extruded D/F | = 6.00 |
| Extrusion rate | = 66 pounds per hour |
| Spinning speed | = 1000 meters per minute |
| Quench air velocity | = 210 feet per minute |

The above creeling of fiber was then processed into 1½-inch staple fiber under the conditions listed below:

```
Line speed                          = 35 meters per minute
Intermediate draft ratio            = 3:1
First stage drafting in water       = 68° C.
Overall draft ratio                 = 3.88:1
Second-stage drafting in steam      = 185° C.
Live steam pressure                 = 5 pounds per square inch
Tow denier                          = 57,600
% relax on high tenacity rolls      = 0%
Heatset temperature                 = 190° C.
Tow dryer temperature               = 60° C.
```

The resulting fiber was tested and found to have the following properties as compared to the properties of PET control fiber:

|  |  | PET Control |
|---|---|---|
| Fiber I.V. (Inherent Viscosity) | 0.401 | 0.560 |
| Crimp angle - tow | 81° | (N.M.*) |
| - staple | 94° | 98° |
| Crimp level, crimps per inch (CPI) | 9.2 | 9.5 |
| Lubricant level, % | 0.183 | 0.15 |
| Staple length | 1.5 in. | 1.5 in. |
| Tenacity, grams per denier (G/D) | 4.22 | 4.7 |
| % Elongation | 27.6 | 40 |
| Tenacity @ 10% elongation, G/D | 3.46 | 1.5 |
| Yarn shrinkage (hot oven 190° C. 10 min.) | 6.0 | 6.0 |
| Denier per filament | 1.61 | 1.5 |

*N.M. — Not Measured

The low-pilling polyester staple fiber or polyethylene terephthalate staple fiber was next evaluated in 50/50, 65/35, 80/20 and/or 100/0 blends with cotton is flannel, oxford, broadcloth and singleknit jersey shirting fabrics. Yarns were spun on a cotton system for four different fabric types.

A 300-pound sample of the above fiber, 1.5 D/F×1½ inch, 0.40 I.V. polyester fiber, was then made into yarns and spun on a cotton system for four different fabric types. The following yarns were spun for the woven fabrics:

| Fabric | Yarn Count | Twist Multiplier | Blend | Fiber |
|---|---|---|---|---|
| 1. Broadcloth | aW. 35/1 | 4.00 | 100% | 0.40 I.V. PET |
|  | bF. 25/1 | 4.00 | 100% | 0.40 I.V. PET |
| 2. As 1 except PET control fiber | | | | |
| 3. Oxford | W. 36/1 | 4.00 | 65% 35% | 0.40 I.V. PET combed cotton as warp |
|  | F. 15/1 | 2.75 | | |
|  | F. 15/1 | 2.75 | 100% | 0.40 I.V. PET |
| 4. As 3 except PET control fiber | | | | |
| 5. Flannel | W. 26/1 | 4.00 | 50% 50% | 0.40 I.V. PET carded cotton as warp |
|  | F. 13/1 | 3.35 | | |
|  | F. 13/1 | 3.35 | 100% | 0.40 I.V. PET | aW — warp
bF — filling

The three types of fabric shown above were constructed as follows:

Broadcloth

This fabric is a 3.7 oz./sq. yd. 100% polyester broadcloth fabric with a finished construction of 90 ends per inch (e.p.i.)×56 picks per inch (p.p.i.). This fabric uses ring spun 35/1 cotton count (c.c.) warp and 25/1 c.c. filling yarns with 4.0 twist multiplier for both yarns.

Oxford Shirting

These fabrics were woven as a 4.5 oz./sq. yd. 65% polyester/35% combed cotton and 80% polyester/20% combed cotton fabrics with a finished construction of 90 e.p.i.×50 p.p.i. Both fabrics utilized ring spun 36/1 c.c. warp and 15/1 c.c. filling yarns with 4.0 and 2.75 twist multipliers, respectively. The 65/35 fabric is 65% polyester/35% combed cotton in warp and filling. The 80/20 fabric is comprised of the same 65/35 polyester/cotton warp but utilizes a 100% polyester filling yarn.

Flannel

These fabrics are 4.0 oz./sq. yd. flannel fabrics finished 48 e.p.i.×42 p.p.i. with a napped face. The fabric utilizes a 26/1 c.c. ring spun 50% polyester/50% carded cotton warp yarn with a 4.0 twist multiplier. The filling yarns were 13/1 c.c. ring spun 50% polyester/50% carded cotton and 100% polyester blend yarns with 3.35 twist multiplier.

The following yarns were spun for the singleknit jersey shirting fabrics:

|  | Yarn Count | Twist Multiplier | Spinning Method | Blend | Fiber |
|---|---|---|---|---|---|
| a. | 30/1 | 3.5 | ring | 100% | 0.40 I.V. PET |
| b. | 30/1 | 3.5 | ring | 100% | control |
| c. | 30/1 | 3.5 | ring | 50% 50% | 0.40 I.V. PET combed cotton |
| d. | 30/1 | 3.5 | ring | 50% 50% | control combed cotton |
| e. | 30/1 | 3.5 | open end | 100% | 0.40 I.V. PET |
| f. | 30/1 | 3.5 | open end | 100% | control |
| g. | 26/1 | 3.5 | open end | 50% 50% | 0.40 I.V. PET combed cotton |
| h. | 26/1 | 3.5 | open end | 50% 50% | control combed cotton |

The above type of fabric was constructed as follows:

Singleknit Jersey Shirting

These fabrics are 4.0 oz./sq. yd 28 cut singleknit jersey shirting fabrics with a finished construction of 38 courses per inch (c.p.i.) and 36 wales per inch (w.p.i.). They were knit from 30/1 c.c. yarns in 100% polyester and 50% polyester/50% combed cotton blends with a 3.5 twist multiplier. Duplicate fabrics were made from ring and open end spun yarns.

Textile performance of all the yarns was satisfactory with the exception of the 30/1, 50/50 low-pill PET/combed cotton open end spun yarns for a singleknit jersey shirting fabric. Unacceptable spinning performance was obtained with this sample, requiring that the yarn count be changed to 26/1 to obtain satisfactory spinning performance. Due to the small sample size being spun with all the yarns, complete evaluations of processing performance could not be made. Refer to Table I for break factor and elongation of yarns that were available for physical properties testing. A loss of 25% in break factor was noted for 100% yarns with smaller losses for the blend yarns.

The yarns were woven or knit into fabric without any difficulties.

The fabrics were dyed and finished. Satisfactory performance was obtained in dyeing and finishing with all fabrics. The dyeability of the fiber is expected to be equal to the control polyester fiber, but with a slightly slower dye rate.

The fabrics were submitted for standard physical properties testing. Each group of fabrics is discussed separately as follows:

1. Broadcloth Fabrics

During fabric testing for the 100% polyester broadcloth fabrics, pilling performance was improved significantly using the low-pill polyester as compared to the control fiber as measured by random tumble pilling and after 50 home washes. Fabric strength losses were approximately 25%. Washed stability and appearance were acceptable. (See Table II.)

2. Flannel Shirting Fabrics

The use of the 50/50 low-pill PET/carded cotton filling yarn in polyester/cotton warp yarn gave a significant improvement in the washed appearance and pilling performance of flannel shirting fabrics as measured by random tumble pilling and 25 home washes. A greater strength loss was seen with this fabric due to the napped filling yarn; however, the fabric still has sufficient strength to meet minimum fabric strength requirements.

3. Oxford Shirting Fabrics

Oxford shirting fabrics were prepared from 65/35 and 80/20 polyester/combed cotton blends. The fabrics were finished using two different procedures. The first or normal finishing was described as "presinged". This consisted of singeing the fabrics in the greige followed by scouring, bleaching, and finishing processes. The second finishing procedure was described as "singed". This procedure consisted of bleaching, scouring and singeing followed by the finishing process. This allowed fuzz on the surface of the fabrics caused by agitation during scouring and bleaching to be removed. The singed fabrics for this reason gave better pilling performance than the presinged fabrics.

Random tumble pilling tests showed that the fabrics containing the low-pill polyester with improved tenacity gave improved pill ratings over the PET polyester control fabrics, especially in the 60- and 90-minute tests.

More improvement in pilling results was obtained with the fabrics made from 80/20 PET/cotton as compared to the 65/35 PET/cotton fabrics. This indicates that the low-pill polyester offers more improvement in the fabrics made utilizing higher polyester content. Strength loss as measured by grab or Elmendorf fabric tests again was approximately 25% compared to polyester control fabrics. Washed stability and appearance was acceptable. Wash tests to 50 cycles illustrated clearly the difference between the control polyester fabrics and the low-pill polyester fabrics. (See Table IV.)

4. Singleknit Jersey Shirting Fabrics

Singleknit jersey shirting fabrics were prepared from ring and open end spun yarns in 100% polyester and 50/50 PET/combed cotton blends. The fabrics revealed very few differences in pilling performance between the ring and open end spun yarns in fabric form. The 100% low-pill polyester fabrics had an approximate 30% decrease in yarn strength as compared to the 100% control polyester fabrics. The 50/50 polyester (PET)/cotton samples had only a slight decline in fabric strength when comparing the low-pill polyester to the control polyester. Fibrillation tests after drycleaning on the low-pill polyester gave acceptable ratings. Random tumble pilling tests on 100% polyester and 50/50 PET/cotton fabrics showed a significant improvement when using the low-pill polyester fiber as compared to the control polyester. The 100% control polyester fabrics showed significantly more pilling than the 100% low-pill polyester fabrics after 50 home washes. The 50/50 PET/combed cotton samples were very good for pilling even after 50 home washes. The low-pill PET/combed cotton fabrics were slightly better than the control polyester/combed cotton fabrics. All of the fabrics were equal in washed stability and appearance. (See Table V.)

Discussion of Results

The 0.40 I.V. polyester fiber made with improved tenacity gives satisfactory textile processing performance. A significant improvement in pilling performance and fabric appearance were obtained with 100% polyester broadcloth and singleknit jersey shirting fabrics.

Good pilling results were also obtained in blends of the 0.40 I.V. low-pill (PET) polyester with improved tenacity with cotton. The fiber was used in 50/50, 65/35 and/or 80/20 PET/cotton blends in flannel, oxford and singleknit jersey shifting fabrics. An improvement in fabric appearance and pilling performance was noted in each case. This series of fabrics also showed that the higher the polyester content of the fabric, the better the pilling performance obtained from using low-pill polyester fiber with improved tenacity.

TABLE I

| | | Yarn Physical Properties | | |
|---|---|---|---|---|
| Examples | Yarn Count | Blend | Break Factor | Elongation, % |
| 1 | 36/1 | 65% low-pill PET 35% combed cotton | 1730 | 7.5 |
| 2 | 36/1 | 65% control PET 35% combed cotton | 2050 | 19.1 |
| 3 | 26/1 | 50% low-pill PET 50% carded cotton | 1920 | 8.0 |
| 4 | 13/1 | 50% low-pill PET 50% carded cotton | 2290 | 8.4 |
| 5 | 25/1 | 100% low-pill PET | 3020 | 12.4 |
| 6 | 25/1 | 100% control PET | 4140 | 26.4 |
| 7 | 35/1 | 100% control PET | 3490 | 23.9 |

TABLE II

| Evaluation of 100% PET Broadcloth Fabrics | | | | |
|---|---|---|---|---|
| | 100% Low-Pill | | 100% Control | |
| | Weight, oz./sq. yd | | | |
| | 3.6 | | 3.8 | |
| | $^a$W | $^b$F | W | F |
| Construction | 90 | 55 | 90 | 59 |
| Grab strength, lb. | 94 | 93 | 133 | 125 |
| Elmendorf tear, gm. | 1500 | 1200 | 2000 | 1900 |
| Washed stability, % | | | | |
| 1 wash @ 140° F. | 0.1 | 0.1 | −0.6 | −0.1 |
| 5 washes @ 140° F. | −0.2 | 0.3 | −0.6 | −0.3 |
| 25 washes @ 140° F. | −0.3 | 0.2 | −0.5 | −0.3 |
| 50 washes @ 140° F. | −0.8 | −0.2 | −1.3 | −0.2 |
| Washed appearance | | | | |
| 1 wash @ 140° F. | 2.5 | | 2.0 | |
| 5 washes @ 140° F. | 2.5 | | 1.5 | |
| 25 washes @ 140° F. | 3.0 | | 3.0 | |
| 50 washes @ 140° F. | 2.0 | | 2.0 | |

TABLE II-continued

| Evaluation of 100% PET Broadcloth Fabrics | | |
|---|---|---|
| | 100% Low-Pill | 100% Control |
| Random tumble pilling | | |
| 30 min. - original | 3.0 | 1.0 |
| 90 min. - original | 3.0 | 1.0 |
| 30 min. - after 5 washes | 3.5 | 1.0 |
| 90 min. - after 5 washes | 3.5 | 1.0 |

$^a$W — warp
$^b$F — filling

TABLE III

Evaluation of Low-Pill PET in Flannel

| Example | 1 | | 2 | |
|---|---|---|---|---|
| Warp | 50/50 1.5 D/F PET/Cotton | | 50/50 1.5 D/F PET/Cotton | |
| Filling | 50/50 1.5 D/F PET/Cotton | | 100% PET | |
| Weight, oz./sq. yd. | 3.9 | | 4.0 | |
| | $^a$W | $^b$F | $^a$W | $^b$F |
| Grab strength, lb. | 29 | 29 | 27 | 40 |
| Elmendorf tear, gm. | 910 | 790 | 1270 | 860 |
| Washed stability, % | | | | |
| 1 wash @ 140° F. | −0.9 | −0.2 | −1.5 | −0.5 |
| 5 washes @ 140° F. | −1.4 | +0.5 | −1.9 | −0.3 |
| 10 washes @ 140° F. | −1.8 | 0.2 | −2.0 | −0.2 |
| 25 washes @ 140° F. | −2.2 | 0.5 | −2.2 | −0.2 |
| 50 washes @ 140° F. | −3.3 | 0 | −3.0 | −0.6 |
| Washed appearance | | | | |
| 1 wash @ 140° F. | | 4.5 | | 4.0 |
| 5 washes @ 140° F. | | 4.0 | | 4.0 |
| 10 washes @ 140° F. | | 4.5 | | 4.5 |
| 25 washes @ 140° F. | | 4.5 | | 4.5 |
| 50 washes @ 140° F. | | 4.5 | | 4.5 |
| Color change | | | | |
| 1 wash @ 140° F. | | 4.5 | | 4.5 |
| 5 washes @ 140° F. | | 4.0 | | 3.5 |
| Random tumble pilling | | | | |
| 30 min. | | 2.0 | | 1.0 |
| 60 min. | | 1.0 | | 1.0 |
| 90 min. | | 3.0 | | 2.5 |
| Crocking | | | | |
| dry | | 4.0 | | 4.0 |
| wet | | 2.0 | | 2.0 |

$^a$W — warp
$^b$F — filling

TABLE IV

Evaluation of PET/Cotton Oxford Shirting Fabrics

| | Examples | | | |
|---|---|---|---|---|
| | 1 | 2 | 3 | 4 |
| | 65% Low-pill 35% Cotton Presinged* | 65% Control 35% Cotton Presinged | 65% Low-pill 35% Cotton Singed** | 65% Control 35% Cotton Singed |
| Weight, oz./sq. yd | 4.3 | 4.3 | 4.3 | 4.3 |
| | $^a$W  $^b$F | W   F | W   F | W   F |
| Construction | 90   50 | 88   51 | 90   50 | 88   51 |
| Grab strength, lb. | 53   68 | 67   130 | 53   78 | 62   117 |
| Elmendorf tear, gm. | 1470  1530 | 2050  2650 | 1440  1920 | 1740  2490 |
| Washed stability, % | | | | |
| 1 wash @ 140° F. | −1.0  −1.7 | −1.0  −2.1 | −0.9  −1.2 | −1.2  −1.7 |
| 5 washes @ 140° F. | −1.5  −2.5 | −1.2  −2.5 | −1.8  −1.5 | −2.0  −2.3 |
| 10 washes @ 140° F. | −2.2  −3.6 | −2.2  −3.8 | −2.4  −2.5 | −3.0  −3.2 |
| 25 washes @ 140° F. | −2.2  −3.8 | −1.5  −2.6 | −2.3  −2.5 | −3.0  −3.3 |
| 50 washes @ 140° F. | −2.0  −3.7 | −2.5  −4.0 | −2.5  −2.1 | −3.2  −3.5 |
| Washed appearance | | | | |
| 1 wash @ 140° F. | 2.5 | 2.5 | 2.5 | 2.5 |
| 5 washes @ 140° F. | 2.5 | 2.5 | 2.5 | 2.5 |
| 10 washes @ 140° F. | 2.0 | 2.0 | 2.0 | 2.0 |
| 25 washes @ 140° F. | 3.0 | 3.0 | 3.0 | 3.0 |
| 50 washes @ 140° F. | 2.0 | 2.0 | 2.0 | 2.0 |
| Random tumble pilling | | | | |
| 30 min. | 4.0 | 3.0 | 4.0 | 3.5 |
| 60 min. | 3.5 | 2.0 | 4.0 | 3.0 |
| 90 min. | 2.5 | 1.0 | 4.0 | 2.0 |

| | Examples | | | |
|---|---|---|---|---|
| | 5 | 6 | 7 | 8 |
| | 80% Low-pill 20% Cotton Presinged | 80% Control 20% Cotton Presinged | 80% Low-pill 20% Cotton Singed | 80% Control 20% Cotton Singed |
| Weight, oz./sq. yd | | | | |

TABLE IV-continued

|  | 4.3 | | 4.2 | | 4.3 | | 4.4 | |
| --- | --- | --- | --- | --- | --- | --- | --- | --- |
|  | W | F | W | F | W | F | W | F |
| Construction | 88 | 51 | 88 | 51 | 88 | 51 | 88 | 51 |
| Grab strength, lb. | 55 | 132 | 70 | 189 | 53 | 102 | 66 | 182 |
| Elmendorf tear, gm. | 1510 | 2730 | 1910 | 4670 | 1480 | 2400 | 1810 | 4450 |
| Washed stability, % | | | | | | | | |
| 1 wash @ 140° F. | −1.2 | −0.5 | −1.2 | −1.3 | −1.2 | −0.4 | −1.2 | −0.8 |
| 5 washes @ 140° F. | −1.2 | −1.5 | −1.7 | −1.8 | −1.5 | −1.0 | −1.2 | −1.0 |
| 10 washes @ 140° F. | −2.3 | −2.2 | −2.8 | −2.8 | −2.2 | −1.5 | −2.4 | −1.8 |
| 25 washes @ 140° F. | −2.3 | −2.7 | −2.8 | −3.1 | −1.8 | −2.9 | −2.5 | −1.9 |
| 50 washes @ 140° F. | −2.0 | −1.9 | −2.8 | −3.0 | −1.4 | −2.2 | −2.7 | −2.1 |
| Washed appearance | | | | | | | | |
| 1 wash @ 140° F. | 2.5 | | 2.5 | | 2.5 | | 2.5 | |
| 5 washes @ 140° F. | 2.5 | | 2.5 | | 2.5 | | 2.5 | |
| 10 washes @ 140° F. | 2.0 | | 2.0 | | 2.0 | | 2.0 | |
| 25 washes @ 140° F. | 3.0 | | 3.0 | | 3.0 | | 3.0 | |
| 50 washes @ 140° F. | 2.0 | | 2.0 | | 2.0 | | 2.0 | |
| Random tumble pilling | | | | | | | | |
| 30 min. | 3.0 | | 1.0 | | 4.0 | | 4.0 | |
| 60 min. | 4.0 | | 1.0 | | 4.0 | | 2.5 | |
| 90 min. | 4.0 | | 1.0 | | 4.0 | | 1.0 | |

*Presinged - singed fabric in the greige
**Singed - singed fabric after desizing, scouring, bleaching
$^a$W - warp
$^b$F - filling

TABLE V

Evaluation of Single Knit Jersey Shirting Fabrics

| Examples | 1 | | 2 | | 3 | | 4 | |
| --- | --- | --- | --- | --- | --- | --- | --- | --- |
| Blend | 100% Low-pill | | 100% Control | | 100% Low-pill | | 100% Control | |
| Spinning system | Ring | | Ring | | Open end | | Open end | |
| Weight oz./sq. yd. | 3.6 | | 3.6 | | 3.5 | | 3.9 | |
| Mullen burst, lb.* | 116 | | 147 | | 97 | | 129 | |
| Fibrillation after drycleaning | 2.5 | | 2.0 | | 2.5 | | 2.0 | |
| Random tumble pilling | | | | | | | | |
| 30 min. | 3.0 | | 1.0 | | 3.5 | | 1.5 | |
| 60 min. | 3.5 | | 1.0 | | 4.0 | | 1.5 | |
| 90 min. | 3.5 | | 1.0 | | 3.5 | | 1.0 | |
|  | $^a$L | $^b$W | L | W | L | W | L | W |
| Construction | 38 | 34 | 38 | 36 | 37 | 33 | 39 | 37 |
| Washed stability | | | | | | | | |
| 5 washes @ 140° F. | −4.0 | 1.7 | −6.5 | 0.3 | −6.6 | 0.2 | −5.6 | −1.2 |
| 10 washes @ 140° F. | −7.8 | −0.5 | −8.0 | −2.2 | −7.8 | 0.7 | −6.8 | −1.8 |
| 25 washes @ 140° F. | −6.2 | −0.5 | −8.3 | −2.6 | −8.2 | −1.0 | −10.9 | 2.1 |
| 50 washes @ 140° F. | −8.1 | 2.8 | −10.1 | −2.8 | −8.0 | −0.3 | −9.1 | 0.7 |
| Washed appearance | | | | | | | | |
| 5 washes @ 140° F. | 4.5 | | 4.5 | | 4.0 | | 4.5 | |
| 10 washes @ 140° F. | 4.0 | | 4.0 | | 3.5 | | 3.5 | |
| 25 washes @ 140° F. | 4.0 | | 4.0 | | 4.0 | | 4.0 | |
| 50 washes @ 140° F. | 4.5 | | 4.5 | | 4.5 | | 4.5 | |

| Examples | 5 | | 6 | | 7 | | 8 | |
| --- | --- | --- | --- | --- | --- | --- | --- | --- |
| Blend | 50% Low-pill 50% Cotton | | 50% Control 50% Cotton | | 50% Low-pill 50% Cotton | | 50% Control 50% Cotton | |
| Spinning system | Ring | | Ring | | Open end | | Open end | |
| Weight oz./sq. yd. | 3.7 | | 3.7 | | 4.4 | | 4.6 | |
| Mullen burst, lb. | 91 | | 96 | | 92 | | 97 | |
| Fibrillation after drycleaning | — | | — | | — | | — | |
| Random tumble pilling | | | | | | | | |
| 30 min. | 4.0 | | 2.0 | | 4.0 | | 2.0 | |
| 60 min. | 4.0 | | 2.0 | | 4.0 | | 2.0 | |
| 90 min. | 4.5 | | 1.0 | | 4.5 | | 2.0 | |
|  | L | W | L | W | L | W | L | W |
| Construction | 37 | 37 | 37 | 36 | 37 | 41 | 37 | 41 |
| Washed stability | | | | | | | | |
| 5 washes @ 140° F. | −10.5 | −2.5 | −12.8 | −1.9 | −10.0 | −0.8 | −10.1 | −0.3 |
| 10 washes @ 140° F. | −12.5 | −3.4 | −15.8 | −3.3 | −10.8 | −1.2 | −10.9 | −0.3 |
| 25 washes @ 140° F. | −15.5 | −0.2 | −16.5 | −2.7 | −11.7 | −1.8 | −15.0 | 2.0 |
| 50 washes @ 140° F. | −14.8 | −1.7 | −16.6 | −3.0 | −11.6 | −1.2 | −13.5 | 0.8 |
| Washed appearance | | | | | | | | |
| 5 washes @ 140° F. | 4.0 | | 4.0 | | 4.5 | | 4.0 | |
| 10 washes @ 140° F. | 3.5 | | 3.5 | | 3.0 | | 3.0 | |
| 25 washes @ 140° F. | 4.0 | | 4.0 | | 4.0 | | 4.0 | |

TABLE V-continued

| 50 washes @ 140° F. | 4.5 | 4.5 | 4.5 | 4.5 |
|---|---|---|---|---|

[a]L - length
[b]W - width
*ASTM D-231

The following examples of 1.5 D/F, 1½" polyethylene terephthalate (PET) with inherent viscosities (I.V.) of 0.40, 0.42, 0.45 and 0.49 were prepared to determine the effect of I.V. on pilling performance. Creelings of each fiber were prepared from 0.58 I.V. PET polymer by adding appropriate amounts of ethylene glycol to the PET polymer prior to extrusion as a fiber. The creelings of fiber were processed into 1½" staple fiber by heatsetting the fiber while holding it at constant length. The staple examples were tested to determine crimp characteristics, tensile properties, and shrinkage.

A 67,500-denier creeling of 1.5 D/F PET polyester fiber was extruded at each set of extrusion conditions listed below:

| Examples | 1 | 2 | 3 | 4 |
|---|---|---|---|---|
| % Ethylene glycol | 0.266 | 0.224 | 0.191 | 0.084 |
| Nominal fiber I.V. | 0.40 | 0.43 | 0.46 | 0.49 |
| Melt temperature, °C. | 268 | 268 | 268 | 290 |
| Spinning speed, m./min. | 1000 | 1000 | 1000 | 1000 |
| Spun denier/filament | 6.00 | 6.00 | 6.00 | 6.00 |
| Extrusion rate, lb./hr. | 66 | 66 | 66 | 66 |
| Quench air velocity, fpm | 210 | 210 | 210 | 210 |
| Polymer type | 0.58 I.V. PET | | | |
| Quench air (cu. ft./min.) | 35 | 35 | 35 | 35 |

The above creelings of extruded fiber were processed into 1½-inch staple (75 pounds/creeling) using the drafting conditions below:

| Examples | 1 | 2 | 3 | 4 |
|---|---|---|---|---|
| Creel denier | 252,000 | 252,000 | 252,000 | 252,000 |
| Line speed, m./min. (nom.) | 39 | 39 | 39 | 39 |
| Intermediate draft ratio | 3.44 | 3.44 | 3.44 | 3.44 |
| First stage drafting in water | 70 | 70 | 70 | 70 |
| Overall draft ratio (nom.) | 4.14 | 4.14 | 4.14 | 4.14 |
| Second stage drafting in water | 180 | 180 | 180 | 180 |
| Heatset type | Constant length heatsetting | | | |
| Hot roll temp. °C. | 210 | 210 | 210 | 210 |
| % Relax | 0 | 0 | 0 | 0 |
| Nominal lube level, % | 0.18 | 0.18 | 0.18 | 0.18 |
| Tow dryer temp., °C. | 60 | 60 | 60 | 60 |
| Processing rate, lb./hr. | 35 | 35 | 35 | 35 |

Each example was checked to determine whether or not it was acceptable according to the fiber specifications listed below:

| | |
|---|---|
| Crimp level, c.p.i. | = 9.5 ± 0.5 |
| Crimp angle, ° | = 88 ± 5 |
| Lubricant level, % | = 0.16 ± 0.03 |
| Staple length, in. | = 1.5 ± 0.1 |
| Fiber I.V. | = Nominal level ± 0.015 |
| Instrom tenacity, G/D | = 4 ± 0.3 |
| % Elongation | = 15 to 30 |
| Hot oven shrinkage, % | = 5.0 |
| Denier/filament | = 1.5 ± 0.2 |

DISCUSSION

All four fiber samples of I.V.'s from 0.40 to 0.49 extruded without difficulty using the conditions given in the procedure. The nominal and measured I.V.'s of the fibers differed only by 0.01 I.V. units or less. The I.V. variability increased as the fiber I.V. decreased.

The draft ratio and line speed used to process the 0.42 and 0.49 I.V. PET fibers were reduced somewhat from the levels given in the procedure because of excessive picking on the rolls. After the speed and ratio were reduced, both fibers appeared to draft satisfactorily. No problems were encountered drafting the 0.40 and 0.45 I.V. fiber samples with respect to picking or roll wraps. See Table VI for spinning/processing conditions and fiber properties.

Fiber Properties

Except for the hot oven shrinkage of the 0.49 I.V. fiber being 1.3% higher than desired, all four fiber samples had acceptable physical properties. The higher shrinkage of Example 4 (Table VI) was probably the result of higher I.V. and greater as-spun orientation resulting from the larger spinneret orifice used to spin this fiber.

TABLE VI

Physical Properties of Low I.V./Constant Length Heatset PET Fiber

| Examples | 1 | 2 | 3 | 4 |
|---|---|---|---|---|
| Melt temp., °C. | 268 | 268 | 268 | 290 |
| % Ethylene glycol | 0.266 | 0.224 | 0.191 | 0.084 |
| Fiber I.V. - X average | 0.400 | 0.420 | 0.451 | 0.486 |
| - S standard deviation | 0.018 | 0.014 | 0.002 | 0.004 |
| Spinneret pressure, p.s.i. | 385 | 483 | 600 | 607 |
| Spinneret | 750.30 | 750.30 | 750.30 | 750.45 |
| Draft line speed m./min. | 39 | 36 | 39 | 36 |
| Draft ratio | 4.14 | 3.82 | 4.14 | 3.82 |
| Draft tension, G/D | 1.31 | — | 1.20 | — |
| % Lubricant | 0.183 | 0.145 | 0.145 | 0.189 |
| % Shrinkage (190° C.-10 min.) | 3.7 | 3.4 | 3.2 | 6.3 |
| Denier/filament | 1.49 | 1.60 | 1.56 | 1.65 |
| Tenacity, G/D | 5.11 | 4.94 | 4.07 | 4.93 |
| % Elongation | 21.2 | 22.0 | 18.6 | 27.9 |
| Tenacity @ 10% elongation | 4.46 | 4.18 | 3.76 | 4.01 |
| Crimp angle, ° | 88.2 | 87.6 | 84.5 | 80.1 |
| Crimp level, c.p.i. | 9.62 | 9.76 | 10.23 | 0.21 |
| Temperature of fiber during heatsetting, °C. | 159 | 172 | 177 | 163 |

Approximately 75 pounds each of 0.40, 0.42, 0.45 and 0.49 I.V. low-pill PET fiber were made. The fiber examples were processed into 35/1 c.c. warp and 25/1 c.c. filling yarns for a 100% polyester broadcloth. Performance of the fibers was considered satisfactory although the 0.49 I.V. had a very high level of harsh. Yarn properties were considered acceptable (see Table VII) except for Uster Imperfections count for the 0.49 I.V. samples which is attributed to the higher harsh level.

The yarns were beamed and slashed with acceptable performance. Weaving was done in an 84 e.p.i.×54 p.p.i. (in-loom) broadcloth construction. Weaving performance was acceptable for each sample with the 0.49 I.V. polyester sample having the best performance because of its highest yarn strength.

Singleknit 28-cut jersey shirting fabrics were prepared using the 25/1 c.c. 100% polyester yarns. No problems were experienced while knitting the yarns at any of the I.V. levels.

The fabrics, knit and woven, were dyed and heatset without the addition of a durable press finish. They were submitted for the following tests (see Tables VIII and IX).

A. Random Tumble Pilling (ASTM D 1375)

Random tumble pilling tests of 30, 60 and 90 minutes were run on the original fabrics and after five washes. The woven fabrics exhibited better pilling performance after washing with the exception of the control which had poorer performance. An I.V. of 0.42 or lower is required to provide acceptable pilling performance in this type fabric.

The knit fabrics had poorer pilling performance after washing and rather poor performance overall. The 0.40 I.V. sample did provide some improvement in performance although it did not receive acceptable pilling ratings. The other samples were in general poorer than the 0.40 I.V. sample although they were better than the PET control.

B. Washed Stability (AATCC 135-1973-Test III-B)

Fabrics were washed 5, 10, 25 and 50 times in a home laundry at 140° F. All fabrics had acceptable stability.

C. Washed Appearance (AATCC 124-1975-Test III-B)

Fabrics were washed 5, 10, 25 and 50 times in a home laundry at 140° C. The woven fabrics were judged for standard appearance grades. Appearance was low for all fabrics due to lack of a durable press resin. Fabrics were also judged on pill formation during washing. The low I.V. samples were all superior to the control with the 0.40 and 0.42 I.V. samples being much better with only slight pilling evident.

The knit fabrics exhibited the same results although more pilling was evident in all samples. Only the 0.40 I.V. sample was judged as being acceptable for appearance from a pilling viewpoint.

D. Grab Strength (ASTM D 1682 Paragraph 15) and Elmendorf Tear Strength (ASTM D 1424)

Grab strength and Elmendorf tear strength were found to be directly related to fiver I.V. The higher the I.V. level of the sample, the higher the grab and Elmendorf strength levels recorded with the exception of the 0.42 I.V. sample which had the lowest strength.

E. Fibrillation to Drycleaning

A sample fabric, about 12 inches by 6 inches, is sewn around two side-by-side pieces of hard rubber, each called a "bolo"; the sewn sample is processed through ten (10) commercial drycleanings in perchloroethylene solvent; and the sample is then compared with a standard set of photographs under a low power microscope. What one is looking for is signs of damage such as any breakdown of fibers which results in a fuzzy appearance in the area of the damage and leaching out of the dyestuff from the damaged fibers. The initial check proved unacceptable for the 0.45 I.V. and lower samples. A repeat of the test gave acceptable results for all the samples.

DISCUSSION OF RESULTS

Although increases in fiber I.V. will give improvement in fiber manufacturing and subsequent textile processing, the advantage in pilling would be lost. For these reasons, the fiber I.V. should be maintained at 0.41±0.02. This fiber I.V. level and control limits should maintain a fiber with acceptable pilling performance when fiber is being produced with an I.V. level at the upper control limit.

The fabrics tested in this project showed that woven fabrics need a fiber with an I.V. of 0.40 to 0.42 to give acceptable pill ratings. Knit fabrics require a fiber with an I.V. of 0.40 to give a significant improvement in random tumble pill ratings although the ratings were still less than desirable.

Fibrillation to drycleaning of the knit fabrics confirmed that the low I.V. polyesters are borderline for fibrillation. Two repeats of the test were performed. One test showed the 0.40, 0.42 and 0.45 I.V. samples as failing while the second test showed the samples as passing the test. This should not cause a significant problem as most of the end uses for this fiber are in the "wash and wear" classification. The rating scale on this test is 1.0=good and 5.0=poor.

TABLE VII

| Physical Properties of Low I.V. PET Yarns | | | | | | | | |
|---|---|---|---|---|---|---|---|---|
| Examples | 1 | | 2 | | 3 | | 4 | |
| Fiber I.V. | 0.40 | | 0.42 | | 0.45 | | 0.49 | |
| Yarn Physical Properties | aW | bF | W | F | W | F | W | F |
| Actual count | 34.1 | 24.8 | 34.9 | 24.6 | 34.5 | 24.8 | 34.7 | 24.7 |
| Break factor | 2970 | 3350 | 2720 | 3190 | 3120 | 3800 | 3170 | 3690 |
| Std. dev. of break factor | 158 | 169 | 173 | 155 | 201 | 149 | 165 | 187 |
| S.E. strength (G/D) | 2.09 | 2.79 | 2.12 | 2.22 | 2.39 | 2.78 | 2.24 | 2.75 |
| % Elongation | 10.3 | 14.3 | 10.9 | 12.7 | 11.4 | 13.2 | 12.1 | 14.8 |
| Shrinkage: | | | | | | | | |
| 190° C. - air (10 min.) | 6.0 | 6.1 | 6.0 | 6.0 | 6.4 | 6.0 | 7.6 | 7.4 |
| boiling water (2 min.) | 1.3 | 0.9 | 1.2 | 1.1 | 1.0 | 0.8 | 1.0 | 1.2 |
| Uster evenness: | | | | | | | | |
| % C.V. | 16.1 | 15.2 | 15.5 | 13.5 | 16.1 | 13.9 | 16.2 | 14.4 |
| Low | 10 | 40 | 31 | 6 | 53 | 4 | 122 | 161 |
| Thick | 40 | 12 | 45 | 6 | 48 | 9 | 388 | 187 |
| Neps | 7 | 2 | 23 | 10 | 7 | 2 | 300 | 24 |
| Total imperfections | 57 | 54 | 99 | 22 | 108 | 15 | 810 | 372 | aW - warp
bF - filling

TABLE VIII

Physical Properties of 100% Polyester Broadcloth Fabrics

| Examples | 1 | | 2 | | 3 | | 4 | | 5 | |
|---|---|---|---|---|---|---|---|---|---|---|
| Fiber Type | 0.40 I.V. | | 0.42 I.V. | | 0.45 I.V. | | 0.49 I.V. | | Control | |
| Fabric weight, oz./sq. yd. | 3.7 | | 3.6 | | 3.7 | | 3.6 | | 3.5 | |
| | W[a] | F[b] | W | F | W | F | W | F | W | F |
| Fabric construction | 90 | 56 | 90 | 56 | 89 | 56 | 90 | 56 | 90 | 56 |
| Grab strength, lb. | 108 | 88 | 103 | 86 | 121 | 102 | 125 | 103 | 135 | 113 |
| Elmendorf tear, gm. | 2010 | 1780 | 1680 | 1530 | 2270 | 2070 | 2200 | 1900 | 2470 | 2230 |
| Washed stability, % | | | | | | | | | | |
| 5 washes @ 140° F. | −0.4 | 0 | −0.6 | −0.3 | −0.6 | −0.1 | −0.7 | 0 | −1.1 | −0.4 |
| 10 washes @ 140° F. | −0.7 | +0.1 | −0.8 | −0.1 | −1.2 | +0.4 | −1.0 | −0.4 | −1.2 | −0.6 |
| 25 washes @ 140° F. | −1.0 | −0.2 | −1.8 | −0.6 | −0.9 | −0.1 | −0.6 | −0.5 | −1.6 | −0.5 |
| 50 washes @ 140° F. | −1.2 | −0.1 | −1.2 | −0.1 | −1.2 | −0.3 | −0.9 | −0.2 | −1.6 | −0.5 |
| Washed appearance | | | | | | | | | | |
| 5 washes @ 140° F. | 3.0 | | 2.0 | | 2.0 | | 1.0 | | 1.5 | |
| 10 washes @ 140° F. | 1.5 | | 2.5 | | 3.0 | | 2.0 | | 1.0 | |
| 25 washes @ 140° F. | 3.0 | | 1.5 | | 3.0 | | 3.5 | | 2.5 | |
| 50 washes @ 140° F. | 3.0 | | 3.0 | | 3.5 | | 3.5 | | 3.0 | |
| Random tumble pilling | | | | | | | | | | |
| Original | | | | | | | | | | |
| 30 min. | 1.0[c] | | 3.0 | | 1.0 | | 2.0 | | 2.5 | |
| 60 min. | 4.0 | | 3.0 | | 1.0 | | 1.0 | | 3.0* | |
| 90 min. | 3.0 | | 4.0 | | 1.5 | | 1.0 | | 1.0 | |
| After 5 washes | | | | | | | | | | |
| 30 min. | 4.0 | | 4.0 | | 1.5 | | 2.0 | | 1.0 | |
| 60 min. | 3.5 | | 3.5 | | 3.5 | | 3.5 | | 1.0 | |
| 90 min. | 4.5 | | 4.5 | | 2.0 | | 2.5 | | 1.0 | |

[a]W - warp
[b]F - filling
[c]1.0 - this result cannot be explained
*fuzzy

TABLE IX

Physical Properties of 100% Polyester Jersey Knit Shirting Fabrics

| | Heatset at Constant Length Examples | | | | Relax Heatset |
|---|---|---|---|---|---|
| | 1 | 2 | 3 | 4 | Control |
| | 0.40 I.V. | 0.42 I.V. | 0.45 I.V. | 0.49 I.V. | Polyester |
| Random tumble pilling | | | | | |
| Original | | | | | |
| 30 min. | 2.0 | 1.0 | 1.0 | 1.5 | 4.0* |
| 60 min. | 3.0 | 1.5 | 1.0 | 2.0 | 1.0 |
| 90 min. | 3.5* | 2.5 | 1.0 | 2.0 | 1.0 |
| After 5 washes | | | | | |
| 30 min. | 1.5 | 1.0 | 1.0 | 1.0 | — |
| 60 min. | 1.5 | 1.0 | 1.0 | 1.0 | — |
| 90 min. | 1.0 | 1.0 | 1.0 | 1.0 | — |

| | L[a] | W[b] | L | W | L | W | L | W | L | W |
|---|---|---|---|---|---|---|---|---|---|---|
| Washed stability, % | | | | | | | | | | |
| 5 washes @ 140° C. | −3.7 | −3.4 | −2.3 | −1.8 | −3.0 | −2.3 | −3.6 | −2.8 | — | — |
| 10 washes @ 140° C. | −4.0 | −3.0 | −3.6 | −2.1 | −3.9 | −3.3 | −3.5 | +0.1 | — | — |
| 25 washes @ 140° C. | −5.4 | −3.2 | −5.0 | −3.6 | −4.8 | −4.2 | −3.7 | −2.1 | — | — |
| 50 washes @ 140° C. | −5.5 | −3.7 | −4.3 | −4.5 | −7.8 | −5.7 | −7.4 | −0.7 | −0.7 | −6.0 |
| Fibrillation to drycleaning | | | | | | | | | | |
| 10 cycles | 4.0[c] | | 3.5 | | 5.0 | | 1.5 | | 1.5 | |
| repeat | 2.5 | | 3.0 | | 1.5 | | 1.5 | | 1.5 | |

[a]L - length
[b]W - width
[c]rating scale: 1.0 = good and 5.0 = poor
*Fuzzy

The properties listed above in the tables, along with the indication of the test method involved and the minimum requirements for the respective properties, are shown as follows:

| Property | Minimum Requirements | Test Method |
|---|---|---|
| Grab strength | 25 pounds | ASTM D 1682 Par. 15 |
| Elmendorf tear | 1.5 | ASTM D 1424 or ASTM D 2262 |

-continued

| Property | Minimum Requirements | Test Method |
|---|---|---|
| strength | pounds | |
| Washed stability | 2.5% | AATC 135-1973 Test-B |
| Washed appearance[1] | 3.0 | AATCC 124-1975-Test III-B |
| Random tumble pilling[1] | 4.0 | ASTM D 1375 |
| Fibrillation[2] | 3.0 | See description above for |

| Property | Minimum Requirements | Test Method |
|---|---|---|
| | | this test method. |

[1] on a scale of 1.0 to 5.0, with 1.0 being poor and 5.0 being best
[2] on a scale of 1.0 to 5.0, with 1.0 being best and 5.0 being poor

Relaxation While Heatsetting

As heretofore suggested, when the fibers (in tow form) are relaxed to a predetermined extent while being heatset to a controlled length, some of the fiber characteristics change slightly, but still retain their low-pilling qualities.

The following is an example of spinning and processing conditions for a polyethylene terephthalate (PET) fiber.

| Extrusion and Spinning | | | |
|---|---|---|---|
| Spinneret type | 750 holes, 0.30 mm. diameter | | |
| Initial polymer I.V. (inherent viscosity) | 0.60 | | |
| Melt temperature | 270° C. | | |
| Extrusion rate | 63.9 lb./hr. | | |
| Quench air velocity | 130 ft./min. | | |
| % ethylene glycol | 0.275 | | |
| Spinning speed | 1000 meters/minute | | |
| Extruded D/F | 5.96 | | |
| Processing | | | |
| Intermediate draw ratio | 3.3 | | |
| First stage drafting in water | 69° C. | | |
| Overall draw ratio | 4.125 | | |
| Second stage drafting in steam | 180° C. | | |
| Live steam pressure | 5 psi. | | |
| Relaxation in heatsetting oven | 2.5% | | |
| Processing line speed | 110 meters/minute | | |
| Heatset temperature | 215° C. | | |
| Tow dryer temperature | 90° C. | | |
| Total denier | 1,260,000 | | |
| Lubricant | fiber lubricant | | |
| Fiber Properties | | | |
| Fiber I.V. (inherent viscosity) | 0.41 | | |
| Crimp angle (staple) | 90.5° | | |
| Crimps per inch | 9.4 | | |
| Lubricant level, % | 0.14 | | |
| Staple length | 1.44 in. | | |
| Tenacity (grams per denier)* | 4.37 | 4.63 | 3.87 |
| % Elongation* | 25.8 | 21.8 | 28.5 |
| Tenacity at 10% elongation, G/D* | 3.55 | 3.91 | 3.21 |
| Yarn shrinkage, % (hot oven, 190° C., 10 min.) | 7.6 1.58 | | |

*This data was collected at different times in the course of operation, and represent, respectively, an average of 4.29 grams per denier, 25.37% elongation, and 3.56 grams per denier at 10% elongation.

A low-pill polyethylene terephthalate fiber having an average inherent viscosity (I.V.) of 0.40 was evaluated in 100% polyester broadcloth and singleknit jersey shirting fabrics and in 50% polyester/50% combed cotton singleknit jersey shirting fabrics. Yarns were ring spun on the cotton system as shown below:

| | Fabric | Yarn Count | Twist Multiplier | Blend | Fiber |
|---|---|---|---|---|---|
| 1. | Broadcloth | [a]W. 35/1 | 4.00 | 100% | 0.40 I.V. PET |
| | | [b]F. 25/1 | 4.00 | 100% | 0.40 I.V. PET |
| 2. | Broadcloth | W. 35/1 | 4.00 | 100% | Control |
| | | F. 25/1 | 4.00 | 100% | Control |
| 3. | Jersey | 30/1 | 3.50 | 100% | 0.40 I.V. PET |
| 4. | Jersey | 30/1 | 3.50 | 100% | Control |
| 5. | Jersey | 30/1 | 3.50 | 50% | 0.40 I.V. PET |
| | | | | 50% | Combed Cotton |
| 6. | Jersey | 30/1 | 3.50 | 50% | Control |
| | | | | 50% | Combed Cotton |

[a]W - warp
[b]F - filling

The two types of fabrics shown above were constructed as follows:

Broadcloth

This woven fabric is a 3.7 oz./sq. yd. 100% polyester broadcloth fabric with a finished construction of 90 ends per inch (e.p.i.)×56 picks per inch (p.p.i.). This fabric uses ring spun 35/1 cotton count (c.c) warp and 25/1 c.c. filling yarns with a 4.0 twist multiplier for both yarns.

Singleknit Jersey Shirting

These fabrics are 4.25 oz./sq. yd. 28-cut singleknit jersey shirting fabrics with a finished construction of 36 courses per inch (c.p.i.) and 48 wales per inch (w.p.i.). They were knit from 30/1 c.c. ring spun yarns in 100% polyester and 50% polyester/50% combed cotton blends with a 3.5 twist multiplier.

Textile performance of all the yarns was satisfactory in cotton system yarn processing. Refer to the following Table I for the physical properties of the yarns. Note that there is substantial reduction in break factor for the 100% yarns with smaller losses for the blend yarns.

The yarns were woven or knit into fabric without any difficulties.

The fabrics were dyed and finished. Satisfactory performance was obtained in dyeing and finishing with all fabrics. The dyeability of the fiber is expected to be equal to the control fiber but with a slightly slower dye rate.

The fabrics were submitted for standard physical properties testing. Each group of fabrics is discussed separately as follows.

Textile Processability

Textile processability of all the yarns was satisfactory in cotton system processing. The physical properties of all the yarns were acceptable for weaving or knitting applications. Note that there is a substantial reduction in break factor for the 100% low-pill polyester yarns as compared to the control. The 50% low-pill polyester/50% combed cotton yarn had strength equal to the 50% control/50% combed cotton yarn. (See following Table I.)

Broadcloth Fabrics

During fabric testing for the 100% polyester broadcloth fabrics, pilling performance was improved significantly using the low-pill polyester as compared to the control fiber as measured by the random tumble pilling. Fabric strength losses were approximately 25%. Washed stability and appearance were acceptable. (See following Table II.)

Singleknit Jersey Shirting Fabrics

During fabric testing for the 100% polyester singleknit jersey shirting fabrics, pilling performance was improved significantly using the low-pill polyester as compared to the control fiber as measured by the random tumble pilling test. Strength of the 100% low-pill polyester fabrics was approximately 15% less than the control fabrics. Washed stability and appearance were acceptable. (See following Table III.) Pilling performance was also improved significantly for the 50% low-pill polyester/50% combed cotton fabric as measured by the random tumble pilling test. Strength losses for the 50% low-pill polyester/50% combed cotton fabric were not significantly less than the control fabric. Washed stability and appearance were acceptable. (See following Table III.)

Discussion of Results

The 0.40 I.V. polyester fiber made with improved tenacity gives satisfactory textile processing performance on the cotton system. A significant improvement in pilling performance was obtained with 100% polyester broadcloth and singleknit jersey shirting fabrics. Yarn physical properties are acceptable for forming into either knit or woven fabrics. Pilling performance was improved significantly in all the fabrics tested. The 100% polyester fabrics showed more improvement than the 50% polyester/50% cotton fabrics.

TABLE II

| Evaluation of 100% PET Broadcloth Fabrics | | | | |
|---|---|---|---|---|
| | 100% Low-Pill | | 100% Control | |
| | Weight, oz./sq. yd. | | | |
| | 3.6 | | 3.5 | |
| | [a]W | [b]F | W | F |
| Construction | 91 | 55 | 92 | 55 |
| Grab strength, lb. | 105 | 92 | 144 | 118 |
| Elmendorf tear, gm. | 2240 | 1840 | 2600 | 2300 |
| Washed stability, % | | | | |
| 3 washes @ 140° F. | −1.0 | −0.6 | −0.6 | −0.5 |
| 5 washes @ 140° F. | −1.2 | −0.6 | −0.5 | −0.5 |
| 50 washes @ 140° F. | −1.3 | −1.3 | −0.9 | −1.3 |
| Washed appearance | | | | |
| 3 washes @ 140° F. | 3.5 | | 3.5 | |
| 5 washes @ 140° F. | 3.5 | | 3.5 | |
| 50 washes @ 140° F. | 3.5 | | 3.5 | |
| Random tumble pilling | | | | |
| 30 minutes - original | 3.0 | | 1.0 | |
| 90 minutes - original | 4.0 | | 1.0 | |
| 30 minutes - after 3 washes | 3.5 | | 2.0 | |
| 90 minutes - after 3 washes | 4.0 | | 1.0 | |

[a]W - warp
[b]F - filling

TABLE I

| Yarn Physical Properties | | | | | | | | |
|---|---|---|---|---|---|---|---|---|
| | Control | *LP | Control | *LP | Control | *LP | Control | *LP |
| | 35/1 | | 25/1 | | 30/1 | | 30/1 | |
| | 100% Polyester | | 100% Polyester | | 100% Polyester | | 50/50 KODEL Polyester/Combed Cotton | |
| Yarn Physical Properties: | | | | | | | | |
| Actual count | 35.4 | 35.6 | 25.6 | 25.3 | 29.3 | 29.6 | 30.1 | 30.3 |
| Break factor | 3569 | 2527 | 3902 | 3148 | 3729 | 3070 | 2014 | 2038 |
| Std. dev. of break factor | 244 | 115 | 220 | 182 | 246 | 93 | 68 | 90 |
| S.E. strength (G/D) | 3.23 | 1.84 | 2.90 | 1.90 | 2.42 | 1.75 | 1.20 | 1.19 |
| % elongation | 25.1 | 14.0 | 26.5 | 16.8 | 25.1 | 14.4 | 14.0 | 6.9 |
| Shrinkage | | | | | | | | |
| (1) 190° C. air (10 min.) | 8.0 | 9.0 | 8.6 | 9.4 | 9.2 | 8.0 | 10.2 | 6.8 |
| (2) boiling water (2 min.) | 1.2 | 3.4 | 2.4 | 4.0 | 2.4 | 3.4 | 4.0 | 3.2 |
| Uster evenness | | | | | | | | |
| (1) % CV | 15.76 | 16.23 | 14.00 | 14.81 | 14.50 | 14.05 | 17.10 | 17.18 |
| (2) low | 34 | 104 | 6 | 38 | 19 | 11 | 58 | 79 |
| (3) thick | 36 | 47 | 9 | 15 | 26 | 15 | 362 | 327 |
| (4) neps | 12 | 6 | 2 | 4 | 13 | 7 | 110 | 91 |
| (5) total imperfections | 82 | 157 | 17 | 57 | 58 | 33 | 530 | 497 |

*LP = low-pill fiber of the invention

TABLE III

| Evaluation of Singleknit Jersey Shirting Fabric | | | | | | | | |
|---|---|---|---|---|---|---|---|---|
| Blend | 100% Low-Pill | | 100% Control | | 50% Low-Pill 50% Cotton | | 50% Control 50% Cotton | |
| Weight, oz./sq. yd. | 4.4 | | 4.2 | | 4.2 | | 4.2 | |
| Mullen burst, lb.* | 143 | | 162 | | 102 | | 110 | |
| Fibrillation after dry cleaning | 2.4 | | 1.0 | | — | | — | |
| Random tumble pilling | | | | | | | | |
| 30 minutes - original | 2.0 | | 1.5 | | 3.0 | | 1.0 | |
| 90 minutes - original | 3.0 | | 1.0 | | 2.0 | | 1.0 | |
| 30 minutes - after 3 washes | 3.0 | | 1.0 | | 3.5 | | 2.5 | |
| 90 minutes - after 3 washes | 2.5 | | 1.0 | | 3.5 | | 1.0 | |
| | [a]L | [b]W | L | W | L | W | L | W |
| Construction | 36 | 50 | 37 | 46 | 37 | 47 | 37 | 47 |
| Washed stability, % | | | | | | | | |
| 3 washes @ 140° F. | −5.1 | −4.0 | −6.1 | −5.2 | −10.0 | −10.0 | −9.9 | −11.1 |
| 5 washes @ 140° F. | −5.5 | −4.3 | −6.0 | −5.2 | −11.2 | −12.1 | −11.0 | −12.7 |
| Washed appearance | | | | | | | | |
| 3 washes @ 140° F. | 4.5 | | 4.5 | | 2.0 | | 3.0 | |
| 5 washes @ 140° F. | 4.5 | | 4.5 | | 3.0 | | 3.0 | |

[a]L - length
[b]W - width
*ASTM D-231

The invention has been described in detail with particular reference to preferred embodiments thereof, but it will be understood that variations and modifications can be effected within the spirit and scope of the invention.

We claim:

1. A process for manufacturing polyethylene terephthalate fibers having improved low-pilling properties which comprise admixing in the feed throat of an extruder polyethylene terephthalate discrete solid polymer materials having an inherent viscosity of about 0.56 to about 0.60 with about 0.25% by weight ethylene glycol to form an admixture;

melting in said extruder said solid polymer materials into a liquid and reacting said admixture to lower the inherent viscosity of said polyethylene terephthalate fibers to an inherent viscosity of about 0.39 to about 0.43, said inherent viscosity being determined by a concentration of 0.5% of the polymer in a solvent comprising 60% by weight phenol and 40% by weight tetrachloroethane, the polymer being dissolved at 125° C. and being measured at 25° C.;

extruding the admixture into fibers;

drafting the fibers; and heatsetting the fibers at a constant length.

2. A process as defined in claim 1, wherein said discrete solid polyethylene terephthalate polymer materials is in the form of pellets.

3. A process as defined in claim 1, wherein said fibers are heatset at constant length for about 90±5 seconds at a temperature of about 200° C. to about 215° C.

4. A process as defined in claim 1, wherein said fibers are drawn at a ratio of about 4:1.

5. A process as defined in claim 2, wherein said extruder is maintained at a temperature of about 265° C. to about 270° C.

6. A process as defined in claim 2, wherein said fibers are heatset at constant length for about 90±5 seconds at a temperature of about 200° C. to about 215° C.

7. A process as defined in claim 1, wherein said polyethylene terephthalate has an inherent viscosity of about 0.58.

8. A polyester fiber as made by the process of claim 1, said fiber being low pilling.

9. A polyester fiber as made by the process of claim 3, said fiber being low pilling, having a tenacity of about 3.5 to about 4.5 grams per denier, and an elongation of about 17% to about 27% and tenacity at 10% elongation of about 2.9 to about 3.5 grams per denier, and a shrinkage at 190° C. for 10 minutes of about 6% to about 8%.

10. A process as defined in claim 1, wherein said fibers are relaxed up to about 5% while being heatset to a controlled length.

11. A process as defined in claim 1, wherein said fibers are relaxed up to about 2.5% while being heatset to a controlled length.

12. A process as defined in claim 11 wherein said fibers are heatset to a controlled length for about 90±5 seconds at a temperature of about 200° C. to about 215° C.

13. A process as defined in claim 10, wherein said fibers are drawn at a ratio of about 3.9:1 to about 4.3:1.

14. A process as defined in claim 10, wherein said polyethylene terephthalate has an inherent viscosity of about 0.58 to about 0.60.

15. A polyester fiber as made by the process of claim 10, said fiber being low-pilling, having a tenacity of about 3.5 to about 4.65 grams per denier, an elongation of about 17% to about 27%, tenacity at 10% elongation of about 3.0 to about 3.95 grams per denier, and a shrinkage at 190° C. for 10 minutes of about 6% to about 8%.

16. A polyester fiber as made by the process of claim 10, said fiber being low pilling, having a tenacity of about 4.0 to about 4.5 grams per denier, an elongation of about 17% to about 27%, tenacity at 10% elongation of about 3.2 to about 3.7 grams per denier, and a shrinkage at 190° C. for 10 minutes of about 6% to about 8%.

* * * * *